(12) United States Patent
Vogler-Ivashchanka et al.

(10) Patent No.: US 7,890,962 B2
(45) Date of Patent: Feb. 15, 2011

(54) BUSINESS PROCESS EXTENSIONS TO ENABLE ALERTS AND REPORTS WITHIN THE CONTEXT OF GROUPWARE

(75) Inventors: Iryna Vogler-Ivashchanka, Los Altos, CA (US); Dennis Brian Moore, Hillsborough, CA (US); Narayan Nayar, Redwood City, CA (US); Frederic E. Samson, Palo Alto, CA (US)

(73) Assignee: SAG AG, Walldorf (DE)

( * ) Notice: Subject to any disclaimer, the term of this patent is extended or adjusted under 35 U.S.C. 154(b) by 1336 days.

(21) Appl. No.: 11/409,378

(22) Filed: Apr. 20, 2006

(65) Prior Publication Data

US 2006/0277554 A1    Dec. 7, 2006

Related U.S. Application Data

(60) Provisional application No. 60/673,813, filed on Apr. 22, 2005, provisional application No. 60/684,169, filed on May 25, 2005.

(51) Int. Cl.
*G06F 3/00* (2006.01)
*G06F 9/44* (2006.01)
*G06F 9/46* (2006.01)

(52) U.S. Cl. .................................................. 719/320
(58) Field of Classification Search .................. 719/320
See application file for complete search history.

(56) References Cited

U.S. PATENT DOCUMENTS

| | | | |
|---|---|---|---|
| 4,862,357 A | 8/1989 | Ahlstrom et al. | 364/407 |
| 5,021,953 A | 6/1991 | Webber et al. | 364/407 |
| 5,237,499 A | 8/1993 | Garback | 364/407 |
| 5,331,546 A | 7/1994 | Webber et al. | 364/407 |
| 5,404,488 A | 4/1995 | Kerrigan et al. | |
| 5,749,079 A | 5/1998 | Yong et al. | |
| 5,754,782 A | 5/1998 | Masada | |
| 5,946,464 A | 8/1999 | Kito et al. | |
| 5,948,040 A | 9/1999 | DeLorme et al. | 701/201 |
| 6,009,408 A | 12/1999 | Buchanan | 705/11 |
| 6,119,095 A | 9/2000 | Morita | 705/5 |
| 6,209,018 B1 | 3/2001 | Ben-Shachar et al. | |
| 6,442,526 B1 | 8/2002 | Vance et al. | 705/5 |

(Continued)

FOREIGN PATENT DOCUMENTS

EP    1460538    1/2004

(Continued)

OTHER PUBLICATIONS

"Microsoft Computer Dictionary" 2002, Microsoft Press, Fifth Edition, p. 499.*

(Continued)

*Primary Examiner*—Qing Wu
(74) *Attorney, Agent, or Firm*—Blakely Sokoloff Taylor & Zafman

(57) ABSTRACT

A backend enterprise server includes an application that sends metadata to a groupware client. The metadata enables an enterprise user to modify a function of the backend application from within the context of the groupware client. The groupware client sends metadata describing the modification back to the backend application where the modification is applied.

9 Claims, 3 Drawing Sheets

U.S. PATENT DOCUMENTS

| | | | |
|---|---|---|---|
| 6,632,251 B1 | 10/2003 | Rutten et al. ................ | 715/530 |
| 6,732,080 B1 | 5/2004 | Blants .......................... | 705/9 |
| 6,801,226 B1 | 10/2004 | Daughtrey ................. | 345/763 |
| 7,050,986 B1 | 5/2006 | Vance et al. | |
| 7,080,021 B1 | 7/2006 | McCulloch | |
| 7,100,195 B1 | 8/2006 | Underwood | |
| 7,167,919 B2 | 1/2007 | Iwamoto et al. | |
| 7,305,381 B1 | 12/2007 | Poppink et al. | |
| 7,310,646 B2 | 12/2007 | Rangadass et al. | |
| 7,343,302 B2 | 3/2008 | Aratow et al. | |
| 2001/0034736 A1 | 10/2001 | Eylon et al. | |
| 2002/0077842 A1 | 6/2002 | Charisius et al. | |
| 2002/0152101 A1 | 10/2002 | Lawson et al. | |
| 2002/0184402 A1 | 12/2002 | Gangopadhyay | |
| 2003/0120526 A1 | 6/2003 | Altman et al. | |
| 2003/0135565 A1 | 7/2003 | Estrada | |
| 2003/0135659 A1 | 7/2003 | Bellotti et al. | |
| 2003/0144892 A1 | 7/2003 | Cowan et al. | |
| 2003/0167281 A1 | 9/2003 | Cohen et al. | |
| 2004/0044987 A1 | 3/2004 | Kompalli et al. | |
| 2004/0083195 A1 | 4/2004 | McCord et al. | |
| 2004/0122835 A1 | 6/2004 | McKibben et al. | |
| 2004/0122853 A1 | 6/2004 | Moore | |
| 2004/0143723 A1 | 7/2004 | Acker et al. | |
| 2004/0148299 A1 | 7/2004 | Teegan et al. | |
| 2005/0010819 A1* | 1/2005 | Williams et al. ............ | 713/201 |
| 2005/0171963 A1 | 8/2005 | Barrett | |
| 2005/0209904 A1 | 9/2005 | Hayashi | |
| 2007/0094110 A1 | 4/2007 | McCrea | |

FOREIGN PATENT DOCUMENTS

| | | |
|---|---|---|
| WO | WO 2004/021185 A2 | 3/2004 |
| WO | WO 2004/021185 A3 | 3/2004 |

OTHER PUBLICATIONS

About Smart Tags, http://office.microsoft.com/en-us/assistance/HP030833041033.aspx printed Mar. 15, 2005.

Andreshak: Tech Ed Frontline News for Office Information Bridge Framework, https://blogs.officezealot.com/joe/archive/2004/05/25.aspx printed Mar. 15, 2005.

Int'l application No. PCT/EP2006/003706 Int'l Preliminary Report on Patentability (Chapter 1) dated Nov. 1, 2007; 8 pages.

Int'l application No. PCT/EP2006/003707 Int'l Preliminary Report on Patentability (chapter 1) dated Oct. 23, 2007; 8 pages.

Non-Final Office Action mailed Oct. 29, 2008 for U.S. Appl. No. 11/312,435.

Final Office Action mailed Nov. 19, 2009 for U.S. Appl. No. 11/408,845 13 Pages.

Final Office Action mailed Dec. 9, 2009 for U.S. Appl. No. 11/409,379 23 Pages.

Final Office Action mailed Nov. 19, 2009 for U.S. Appl. No. 11/408,845, 13 Pages.

Final Office Action mailed Dec. 9, 2009 for U.S. Appl. No. 11/409,379, 23 Pages.

Advisory Action mailed Feb. 16, 2010 for U.S. Appl. No. 11/408,845, 5 Pages.

Final Office Action mailed Mar. 4, 2010 for U.S. Appl. No. 11/350,294, 21 Pages.

EP Application No. 06 724 504.3-2221; EP communication dated Mar. 4, 2008.

Final Office Action mailed May 9, 2008 for pending U.S. Appl. No. 11/312,435.

Dan Woods, "Packaged Composite Applications: A Liberating Force for the User Interface", internet document, Oct. 2003, p. 1-4, XP-002349437.

Anonymous, "Business Add-Ins", internet document, Jul. 24, 2002, p. 1-15, XP-002296620.

John Clarkson, "Creating Add-Ins in Microsoft Excel 97", internet document, Apr. 1999, p. 1-3, XP-002296622.

Anind K. Dey et al., "CyberDesk: A Framework for Providing Self-Integrating Context-Aware Services", 1998 International Conference on Intelligent User Interfaces, New York, New York, Jan. 6, 1998, p. 47-54, XP-002155976.

International Search Report and Written Opinion, PCT Application No. PCT/EP2006/001110, filed Feb. 8, 2006, mailed Apr. 6, 2006, 11 pages.

Non-Final Office Action for U.S. Appl. No. 11/408,845 dated May 19, 2009; 33 pages.

Kum-Yew Lai et al., "Object Lens: A 'Spreadsheet' for Cooperative Work", ACM Transactions on Office Information Systems, vol. 6, No. 4, Oct. 1988, pp. 332-353, XP-002333144.

International Application No. PCT/EP2006/001110 Int'l Preliminary Report on Patentability dated Aug. 23, 2007.

International Search Report and Written Opinion, PCT Application No. PCT/EP2006/003706, filed Apr. 21, 2006, mailed Aug. 22, 2006, 11 pages.

International Search Report and Written Opinion, PCT Application No. PCT/EP2006/003708, filed Apr. 21, 2006, mailed Aug. 22, 2006, 12 pages.

Non-Final Office Action for U.S. Appl. No. 11/409,379, Mailed Aug. 5, 2009, 48 pages.

Non-Final Office Action for U.S. Appl. No. 11/350,294, Mailed Sep. 16, 2009, 36 Pages.

Non-Final Office Action for U.S. Appl. No. 11/408,844 Mailed Apr. 1, 2010, 47 Pages.

Non-Final Office Action for U.S. Appl. No. 11/409,379, Mailed May 10, 2010, 31 Pages.

Non-Final Office Action for U.S. Appl. No. 11/408,845, Mailed Jun. 24, 2010, 9 Pages.

\* cited by examiner

BUSINESS PROCESS EXTENSIONS TO ENABLE ALERTS AND REPORTS WITHIN THE CONTEXT OF GROUPWARE

RELATED APPLICATIONS

The present application claims the benefit of priority under 35 U.S.C. §119(e) to U.S. Provision Application No. 60/673,813, filed Apr. 22, 2005, and U.S. Provisional Application No. 60/684,169, filed May 25, 2005.

FIELD

Embodiments of the invention relate to business process workflow management, and more particularly to enabling access and modification of business process alerts and reports from a productivity software application.

BACKGROUND

In enterprise systems, workflows are often used by participants of a workflow in performing work. A workflow generally refers to a flow of tasks associated with a business process. Enterprises increasingly rely on computers for performing tasks related to a business process, and thus, for executing the tasks of a workflow. Computers can provide mechanisms for modeling, executing, and/or controlling workflows, typically through a graphical user interface (GUI). A GUI may be related to a particular program or application that acts as an interface for operating on a workflow.

Traditional interfaces to workflows involve unrelated desktop applications. Thus, a participant in a workflow may receive a notification of one or more tasks via an email application or other collaborative software, and then need to launch a Web browser or other application to access an enterprise system that will enable the participant to complete the task(s). The use of multiple, independent applications has at least the defect of being time-consuming. Depending on the applications being used, the use of the multiple, independent applications can result in security and/or access issues. The applications a workflow participant uses for performing work may be inadequately designed for enterprise access control/security typically involved in interacting with enterprise data. Thus, one or more applications that a workflow participant uses with regularity may be less secure and/or less capable of dealing with enterprise business process tasks. Additionally, a workflow participant cannot modify, control, or manage enterprise backend functions from within the context of a single desktop application.

SUMMARY

An extension to a groupware client enables the groupware client to access and/or modify a function associated with a business process from within the context of the groupware client. A backend enterprise server includes an application that sends metadata to a groupware client. The metadata enables an enterprise user to modify a function of the backend application from within the context of the groupware client. The groupware client sends metadata describing the modification back to the backend application where the modification is applied. Application of the modification affects the business process on the enterprise level. Thus, an enterprise server that manages the business process can interface with the groupware client through the extension to enable the modification and/or input related to the function to be implemented in the enterprise backend services. Information related to the business process is persisted within the groupware client to provide updated information regarding the business process and/or its related workflow within the groupware client.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
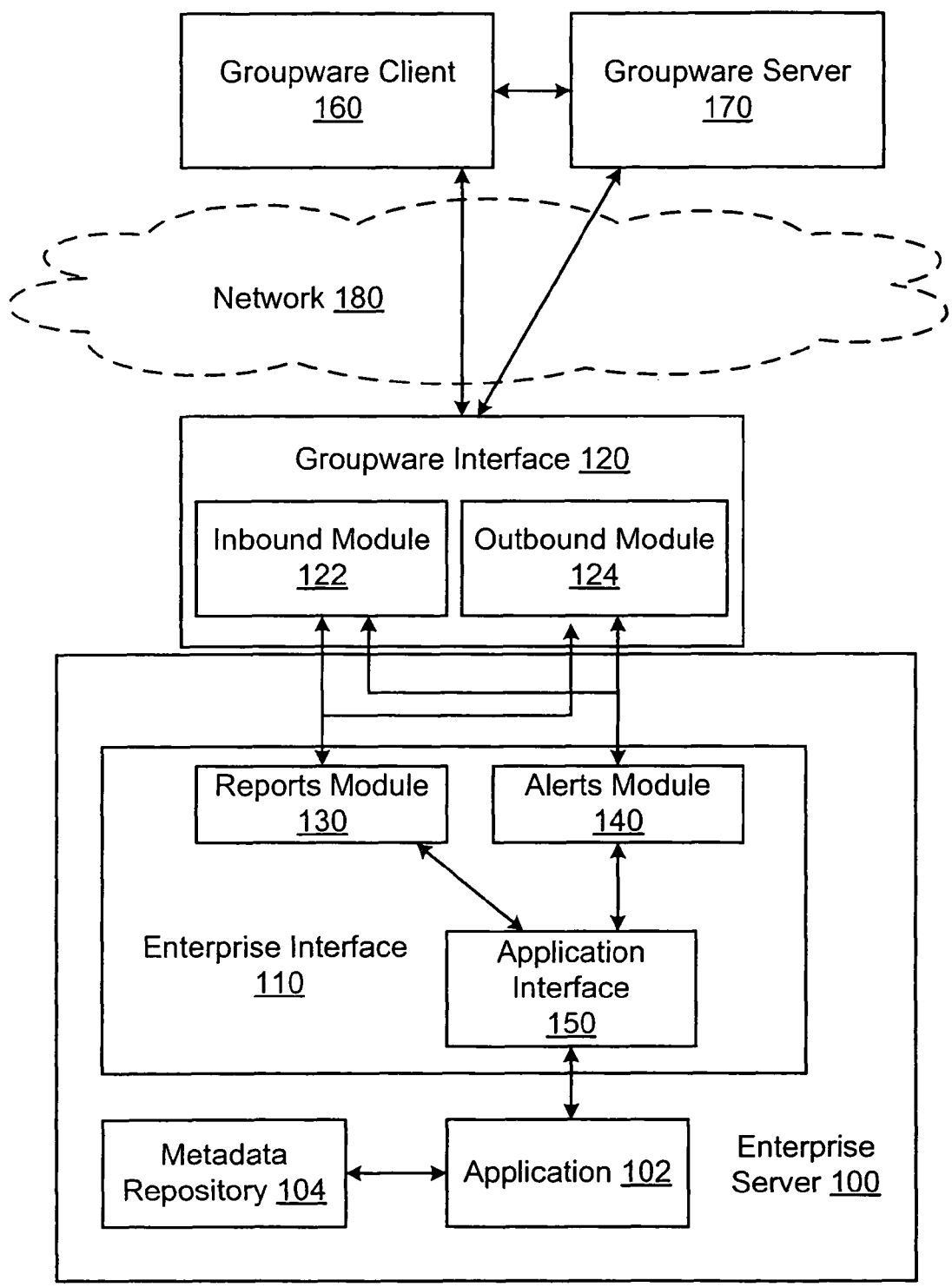
FIG. 1 is a block diagram of an embodiment of the invention.

Extensions can be provided to a groupware client to enable access to an enterprise backend business process via the groupware client. These extensions enable an enterprise user to modify one or more functions of a business process from with the context of a groupware client. As used herein, groupware refers to any of a type of collaborative software, for example, email software, spreadsheet software, etc. Groupware is generally associated with a server that provides data and/or functionality to the software. A client refers to a program, routine, etc., that allows interaction with the groupware server. In one embodiment, a client refers to an application with a user interface that includes native functionality to access the groupware server. In an alternate embodiment, a client may operate/exist/execute independently of an application that has a user interface, and may in fact provide groupware server access functionality to multiple applications. Thus, a groupware client as referred to herein may refer to a groupware application, or to a program that enables one or more applications to access a groupware server. With extensions as described herein, an enterprise user can access and interact with a business process through a groupware client. In one embodiment, the groupware client is generated as a modeled software program.

As used herein, a business process refers broadly to a process and/or the instrumentalities for performing work within an enterprise. An enterprise server may be maintained for organizing and/or storing useful data related to a business process and other related operations. For example, enterprise data may include "sales data," "expenses" data, "hiring profile" data, and/or any other data related to the operation of a business. Enterprise data may be organized, parsed, combined, etc., in a variety of ways including by subject matter, by dates, by amounts, by percentages, etc. For example, a retail merchandiser may keep records and/or data on "merchandise returns" (i.e., where customers return merchandise for a refund). The merchandiser may specifically track raw numbers of returns, dollar amounts, product types, etc. Enterprise data may be tracked and stored on a periodic or ad hoc basis and may serve as the impetus for various responsive actions such as the creation of reports, alerts, tasks, etc. These actions may be integrated into a workflow. A workflow includes one or more phases, each phase an action or activity to be executed/performed in furthering progress towards the end goal of a business process. Each phase of a workflow may include a single item of work (an "action"), or a set of actions (an "activity").

The extensions provided to the groupware client can enable integration of business process tasks into the environment of the groupware client (or an application with which the groupware client is associated). A groupware client can access data objects, forms, functions, services, data structures, and/or processes through enterprise-interface extensions (e.g., via services), to access items that exist or are managed in a business backend system. The business backend system includes logic and services to manage and control the data and processes. The business backend can be provided with extensions (as needed) to enable the groupware client to access the backend services. In one embodiment, an intermediate manager or server is provided to enable access from the groupware client to backend enterprise services.

The integration of access to business process tasks enables an enterprise user to act on contextual information (e.g., reports, documents, hints, data, etc.) locally from within a groupware application. The user interface of a groupware application is likely to be familiar to the enterprise user, and may allow the integration of tools of the groupware application (e.g., spellchecking, translations, etc.) into the performance of an action or activity. The phrase "from within the context of the groupware client," as used herein, refers to the ability of an enterprise user to interact (e.g., create, process, track, set preferences, etc.) with backend enterprise services through the familiar user interface of the groupware client or associated application.

In contrast to the integrated use of groupware with backend enterprise services as described herein, current email notifications or other traditional functions of groupware focus only on a single task or action with respect to the business process. With the integration of groupware functionality and enterprise access, the business process information presented in the groupware application is persisted with the integrated groupware client. For purposes of simplicity in description, use of the term "groupware client" may refer to the groupware client and/or its associated groupware application(s). Persisting the information refers to making the information available to the enterprise user either continuously, or upon request, and from within the context of the groupware client. For example, status information may be provided to the groupware client to provide updated information for the business process within the groupware client. Also, or in the alternative, status information could be accessible, for example, when the enterprise user selects an item/icon or executes an action within the groupware client. Persisting the information may include storing the information locally to the groupware client, or within a storage location within a groupware server, in addition to storing the information within the enterprise backend.

FIG. 1 illustrates an embodiment of an enterprise server 100 interacting with a groupware client 160 and/or a groupware server 170. Application 102 executes on enterprise server 100 and performs various backend processing functions related to a business process. For example, application 102 may track data related to revenue and expenses of a business. Expense data may include travel expenses, salaries, wages, overtime, overhead, etc. Revenue data may include gross revenue, net profits, capital investments, etc. In one embodiment, application 102 organizes, sorts and/or prioritizes the tracked data based on an assortment of parameters including dates, percentages, variance, totals, etc.

The parameters for organizing, sorting and/or prioritizing data may be treated as descriptions and/or conditions for defining business process rules and/or generating business process reports. In one embodiment, these parameters are communicated from application 102 to groupware client 160 to enable an enterprise user to modify, establish, or create a business process rule or report by selecting parameters from within the context of groupware client 160. For example, a sales manager for a retail merchandiser may suspect or have knowledge that merchandise returns (i.e. customers returning merchandise for a refund) have been higher than average over a recent time period. Thus, the sales manager in this example (an enterprise user) may cause a specific report or rule to be generated or created by selecting specific parameters (i.e., descriptions and/or conditions) communicated to the groupware client 160.

In one embodiment, the sales manager creates a rule from within the context of the groupware client 160 that causes an alert to be sent to the sales manager or other selected recipient(s) if, for example, the percentage of variance between merchandise returns from one month to the next is greater than a certain amount (e.g., 10%). In another embodiment, the sales manager (or other enterprise user) selects parameters for generating a business report. Again, using "merchandise returns" as an example, the sales manager can select various statistics and data related to "merchandise returns" from within the context of the groupware client, causing a custom report to be generated.

When an enterprise user selects/defines parameters from within the context of the groupware client 160, the selected/defined parameters are communicated back to enterprise server 100, and, more specifically, to application 102. As used herein, data communicated between application 102 and groupware client 160 for the purpose of establishing, creating, modifying and/or synchronizing selected parameters for rules, reports, etc., is referred to as "metadata." The use of the term "metadata" herein should be interpreted broadly and not in a restrictive sense. Metadata is simply information or data about other data. Metadata can refer to data that describe the structure and/or workings of an enterprise's use of information, and which describe the systems used by the enterprise to manage that information. Metadata may also refer to data and/or information formatted for display/presentation (e.g., spreadsheets, documents, etc.).

In one embodiment, enterprise server 100 includes a metadata repository 104. Metadata from metadata repository 104 is sent to groupware client 160 to communicate information associated with the functions, parameters, operations, etc., of application 102. Referring back to the example of the retail merchandiser, metadata related to "merchandise returns" may be sent from application 102 to groupware client 160, enabling a sales manager or other enterprise user to modify or establish a business process rule or report from within the context of groupware client 160.

In one embodiment, metadata associated with application 102 is sent to application interface 150, which routes the metadata through reports module 130 or alerts module 140 to the groupware interface 120. Groupware interface 120 represents hardware and/or software to provide groupware-enterprise integration/management. In one embodiment, part or all of groupware interface 120 is incorporated within groupware server 170. In another embodiment, part or all of groupware interface 120 is incorporated within enterprise server 100. In another embodiment, part or all of groupware interface 120 is a standalone entity in hardware and/or software. In one embodiment, groupware interface 120 includes one or more components based on Enterprise Services Architecture (ESA) available in conjunction with mySAP and NETWEAVER products available from SAP AG of Walldorf, Germany, and/or one or more components based on MICROSOFT .NET. In one embodiment, groupware interface 120 is a server or manager product (e.g., a MENDOCINO server available from collaborative efforts of MICROSOFT CORPORATION and SAP AG). Thus, groupware interface 120 may also be referred to as an interface server, or an enterprise-groupware manager.

Groupware interface 120 provides one or more mechanisms to enable interaction between groupware client 160 and enterprise server 100. The interaction may include requests between groupware client 160 and enterprise server 100, and responses to those requests. From the groupware side, groupware client 160 sends metadata to make requests and/or send actions or commands to perform a function with respect to enterprise data related to a business process that exists within the context of groupware client 160. Enterprise server 100 sends metadata to provide reports, errors, status or other information, data objects, service access, etc., to groupware client 160 through groupware interface 120.

In one embodiment, groupware server 170 is coupled over network 180 to groupware interface 120 of enterprise server 100. Network 180 may include one or more local area networks (LANs), including wireless or wired networks, and hardware with which to operate on the network. Network 180 may also include other networks, for example, wide area networks, enterprise networks, virtual private networks (VPNs), etc. In one embodiment, groupware server 170 exists within the same local network as groupware interface 120 and/or enterprise server 100, although existence within the same local network is not a requirement. Enterprise server 100 represents both hardware and software that operates to provide enterprise data and services access and/or management.

Groupware interface 120 includes an inbound module 122 and an outbound module 124. In one embodiment, metadata sent by application 102 to groupware interface 120 is routed through outbound module 122 directly to groupware client 160. In another embodiment, outbound module 122 routes metadata to groupware client 160 via groupware server 170. The metadata sent to groupware client 160 enables modification of a function of application 100 (e.g. a report, rule, etc.) from within the context of groupware client 160 (as opposed to modifying the function of application 100 from within the content of application 100 itself).

When a modification of a function takes place within the context of groupware client, metadata is sent back to enterprise server 100 so that the modification may be applied by application 100. Metadata that is sent from groupware client 160 is received by the inbound module 122 of groupware interface 120. In one embodiment, the received metadata is associated with generating and/or modifying a business report. Thus, inbound module 122 routes the metadata through reports module 130. In another embodiment, the metadata is associated with a rule and/or alert and is routed through alerts module 140. One of skill in the art will appreciate that other modules relating to various functions of application 100 may also be used for routing function-specific metadata to and from groupware interface 120. Metadata passing through reports module 130 or alerts module 140 is sent to application interface 150. Application interface 150 supplies the metadata sent from groupware client 160 to application 100 where the metadata is applied to create and/or modify one or more functions of application 100.

Figure 2A:
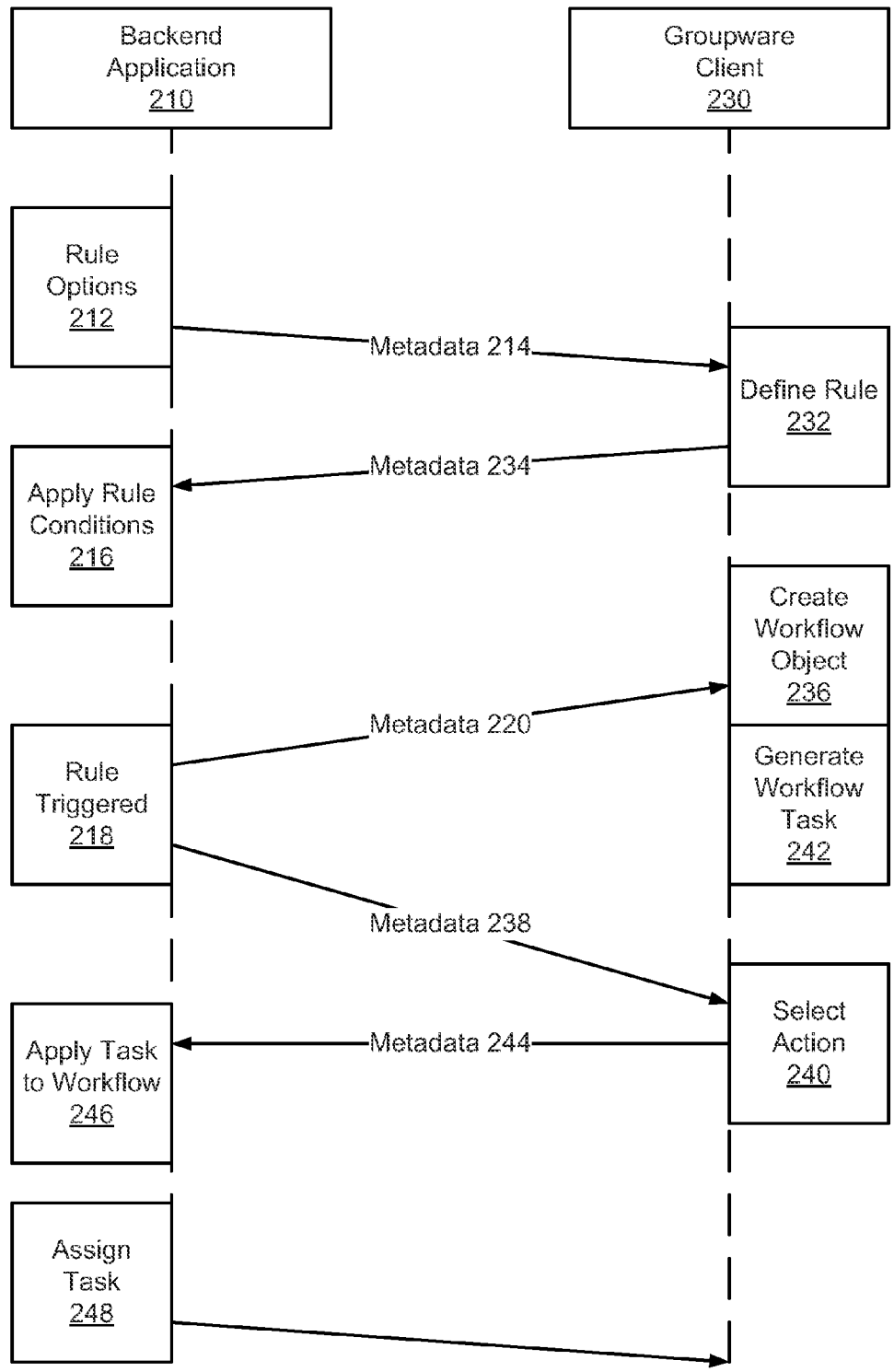
FIG. 2A is a block/flow diagram illustrating an embodiment of the invention.

FIG. 2A illustrates another embodiment of the invention. Rules, alerts, actions, etc. may be synchronized between backend application 210 and groupware client 230. More particularly, groupware client 230 is enabled to modify rules associated with backend application 210 from within the context of groupware client 230.

In one embodiment, backend application 210 contains various rule options 212. Rule options 212 define conditions for triggering a rule in backend application 210. Examples of conditions may include minimum and/or maximum threshold values for business related statistics and/or other data, cumulative counts, efficiency measurements, etc. Thus, rule options 212 provide a flexible framework for defining an occurrence or set of circumstances that justifies an alert. Backend application 210 sends metadata 214 describing rule options 212 to groupware client 230. The metadata 214 enables a user of groupware client 230 to select and/or modify rule options 212 in order to define a business process rule 232 from within the context of groupware client 230. For example, groupware client 230 can be an application such as OUTLOOK, available from MICROSOFT CORPORATION of Redmond, Wash. From within the context of Outlook, a user may select and/or modify rule options 212 to create/modify the backend business process rule.

Once a rule has been defined, groupware client 230 sends metadata 234 back to backend application 210. Metadata 234 describes the rule conditions selected/created at the groupware client 230. Backend application applies the rule conditions 216. Rule conditions may define a rule that triggers, for example, when a defined numeric value related to "merchandise returns" exceed a threshold. Thus, backend application implements the rule in the backend by applying the rule conditions to application 210.

At some point after the rule conditions have been applied 216 to backend application 210, the rule conditions may be satisfied, causing the rule to be triggered 218 in the backend. Backend application sends metadata 220 to groupware client 230 in response to the triggering of the rule. Metadata 220 enables groupware client 230 to create a workflow object 236 related to the triggered rule. A workflow object, as used herein, may include any action or activity directly or indirectly related to a business workflow, including, but not limited to, tasks, emails, alerts, notifications, meeting requests, etc.

In one embodiment, sending metadata 220 to create workflow object 236 also includes sending metadata 238 that enables an action to be selected 240 for the workflow object. The action can be selected from groupware client 230. In one embodiment, metadata 220 is sent to further generate workflow task 242 at groupware client 230 in response to selecting the action 240.

In one embodiment, in response to selecting the action groupware client 230 sends metadata 244 to backend application 210 to indicate a workflow task should be applied 246. For example, completed tasks may be applied. Thus, backend application 210 receives metadata 244 from groupware client 230 to apply the task to a workflow 246 of the backend application. In one embodiment the backend application further automatically assigns the task 248 to an enterprise user.

Figure 2B:
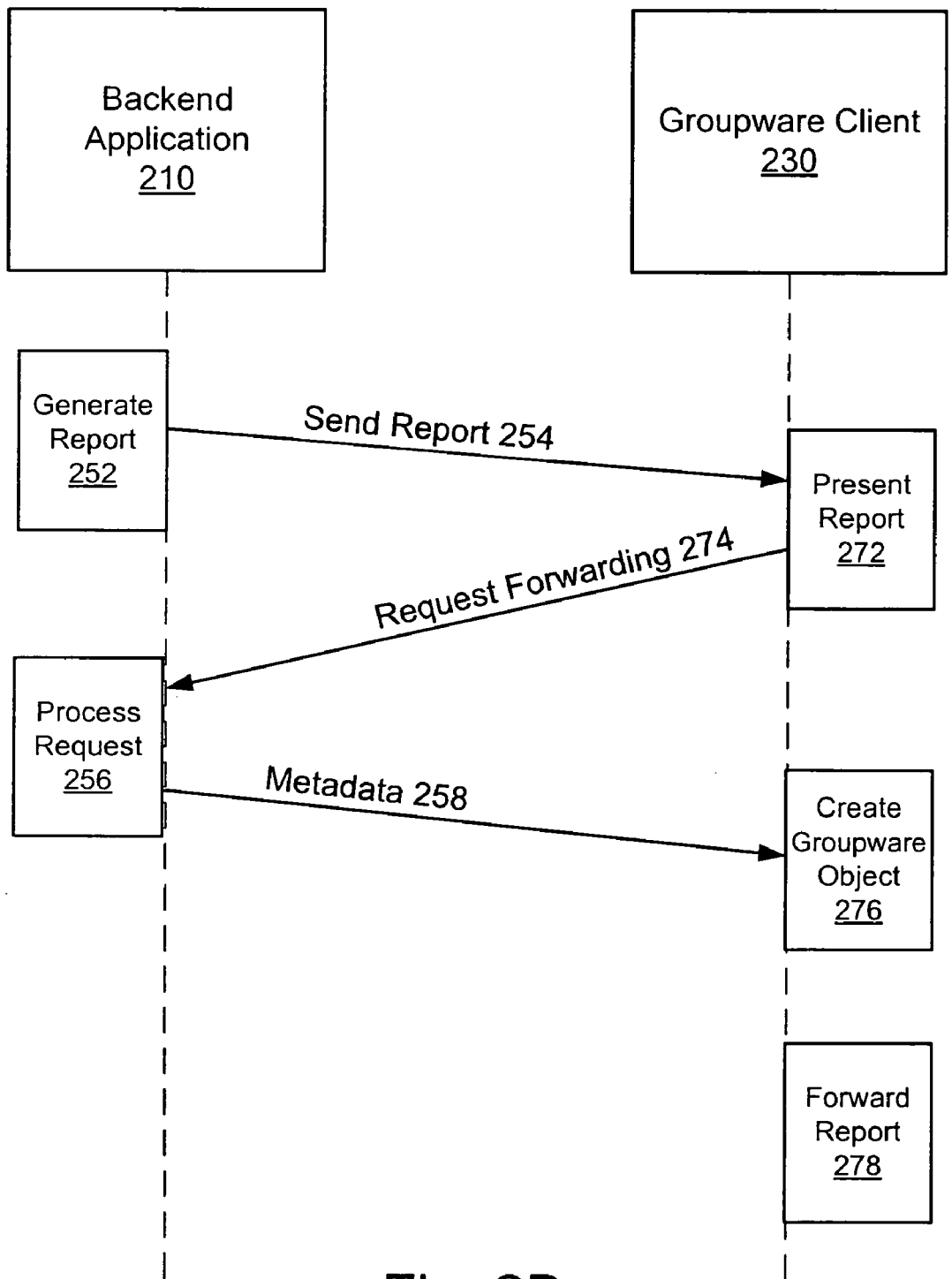
FIG. 2B is a block/flow diagram further illustrating an embodiment of the invention.

FIG. 2B illustrates another embodiment of the invention. Backend application 210 generates a report 252. The report may include statistics, data, and/or other information associated with one or more particular aspects of a business and/or business process. In one embodiment, the report is generated automatically. In another embodiment, the report is generated by request or command. Once the report is generated, the report is sent 254 to groupware client 230 for presentation (e.g., viewing by an enterprise user). The report may be sent 254 as metadata or it may be sent according to some other mechanism for transferring the information in the report. The report is then presented, 272, from within the context of groupware client 230. Presentation of the report can include displaying report information with figures, graphs, spreadsheets, or other display formats. The presentation may be presented visually and/or with audio.

In one embodiment, backend application 210 receives a request to forward a copy of the report 274. For example, when an enterprise user is presented with a report, that user may desire to have another enterprise user receive a copy of the report. In one embodiment, the forwarding request 274 includes a request to forward a static copy of a report. In another embodiment, the forwarding request 274 includes a request to forward a dynamic copy of the report. The forwarding request 274 may be sent as metadata or it may be sent according to some other mechanism for transferring the information in the report.

Backend application 210 receives the forwarding request 274 and processes the request 256. To process a static forwarding request, backend application 210 sends metadata 258 to groupware client 230 to create a new groupware object 276 with a copy of the report from within the context of groupware client 230. A "static report," "static report copy," or "static report data," as used herein, refers to a duplicate or exact copy of the originally presented report.

A "dynamic report," "dynamic report copy," or "dynamic report data," as used herein, refers to a report that is similar in subject matter, organization and presentation to the originally presented report, but includes dynamically updated (i.e., current) information and/or data. For example, if an originally presented report includes information, data, and/or statistics current through the $10^{th}$ day of a month, a dynamic copy of the report sent 5 days later would include information, data, and/or statistics current through the $15^{th}$ day of the month. To process a dynamic forwarding request, backend application 210 sends metadata 258 to groupware client 230 to create a new groupware object 276. Additionally, in this embodiment, the metadata includes embedded calls to backend application 210 to dynamically fill in the data and/or other information for the report. Once a new groupware object has been created, 276, with a copy of the report, groupware client may forward the report copy to a desired location.

In another embodiment, a report is sent to groupware client 230 according to a particular display style and/or format. An enterprise user who views the report may desire to see the report in a different display style and/or format. Thus, the enterprise user makes changes to the display style/format according to taste/preference. The changes are made from within the context of groupware client 230. Once the changes have been made, groupware client 230 sends metadata describing the style/format changes to backend application 210. The modification(s) is/are applied by backend application 210 so that future reports and/or copies generated by backend application 210 are presented to groupware client 230 according to the modified display style/format. Thus, when a report is generated in backend application 210, the metadata sent to groupware client 230 defines the parameters of the modified display format.

Embodiments of the invention described above may include hardware, software, and/or a combination of these. In a case where an embodiment includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media such as read only memory (ROM), random access memory (RAM), magnetic disk storage media, optical storage media, flash memory devices, etc. The machine accessible medium may further include an electronic device having code loaded on a storage that may be executed when the electronic device is in operation. Thus, delivering an electronic device with such code may be understood as providing the article of manufacture with such content described above.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for modifying a business process, comprising:
    sending definition metadata from a backend application of a backend enterprise server to a groupware client to enable one or more conditions associated with a business process rule of the backend application to be defined from within a context of the groupware client,
    the groupware client being a collaborative application of an office suite of applications having an associated groupware server that provides services to associated collaborative applications,
    wherein the backend application of the backend enterprise server interacts directly with the groupware client via an enterprise groupware interface, bypassing the groupware server, to allow access to the groupware client to enterprise data associated with execution of a workflow from within the context of the groupware client;
    receiving response metadata from the groupware client, wherein the response metadata indicates the defined one or more conditions associated with the business process rule; and
    applying the defined conditions for the business process rule to the backend application of the backend enterprise server, including
        triggering the business process rule in the backend application when one or more of the defined conditions are met; and
        sending workflow object creation metadata to the groupware client to create a workflow object from within the context of the groupware client in response to the triggered business process rule.

2. The method of claim 1, wherein sending the workflow object creation metadata to create a workflow object further comprises:
    sending selection metadata that enables an action to be selected for the workflow object.

3. The method of claim 2, further comprising sending the workflow object creation metadata to the groupware client to generate a workflow task from within the context of the groupware client in response to selecting the action.

4. The method of claim 3, further comprising receiving additional response metadata from the groupware client to apply the workflow task to a workflow of the backend application.

5. The method of claim 3, further comprising automatically assigning the workflow task to an enterprise user.

6. An article of manufacturing comprising a machine readable storage medium having content stored thereon to provide instructions to cause a machine to perform operations, including:
   sending definition metadata from a backend application of a backend enterprise server to a groupware client to enable one or more conditions associated with a business process rule of the backend application to be defined from within a context of the groupware client,
   the groupware client being a collaborative application of an office suite of applications having an associated groupware server that provides services to associated collaborative applications,
   wherein the backend application of the backend enterprise server interacts directly with the groupware client via an enterprise groupware interface, bypassing the groupware server, to allow access to the groupware client to enterprise data associated with execution of a workflow from within the context of the groupware client;
   receiving response metadata from the groupware client, wherein the response metadata indicates the defined one or more conditions associated with the business process rule; and
   applying the defined conditions for the business process rule to the backend application of the backend enterprise server, including
      triggering the business process rule in the backend application when one or more of the defined conditions are met; and
      sending workflow object creation metadata to the groupware client to create a workflow object from within the context of the groupware client in response to the triggered business process rule.

7. The article of manufacture of claim 6, wherein sending the metadata to create a workflow object further comprises:
   sending selection metadata that enables an action to be selected for the workflow object.

8. The article of manufacture of claim 7, further comprising:
   sending the workflow object creation metadata to the groupware client to generate a workflow task from within the context of the groupware client in response to selecting the action.

9. The article of manufacture of claim 8, further comprising receiving additional response metadata from the groupware client to apply the workflow task to a workflow of the backend application.

\* \* \* \* \*